US011531894B1

(12) United States Patent
Ogale et al.

(10) Patent No.: US 11,531,894 B1
(45) Date of Patent: *Dec. 20, 2022

(54) NEURAL NETWORKS FOR OBJECT DETECTION

(71) Applicant: Waymo LLC, Mountain View, CA (US)

(72) Inventors: Abhijit Ogale, Sunnyvale, CA (US); Alexander Krizhevsky, Mountain View, CA (US); Wan-Yen Lo, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/013,117

(22) Filed: Sep. 4, 2020

Related U.S. Application Data

(63) Continuation of application No. 16/022,901, filed on Jun. 29, 2018, now Pat. No. 10,769,809, which is a (Continued)

(51) Int. Cl.
  *G06T 7/73* (2017.01)
  *G06N 3/08* (2006.01)
  (Continued)

(52) U.S. Cl.
  CPC ............... *G06N 3/08* (2013.01); *G06K 9/627* (2013.01); *G06N 3/04* (2013.01); *G06N 3/0454* (2013.01); *G06N 3/084* (2013.01); *G06T 7/73* (2017.01); *G06T 7/74* (2017.01); *G06V 10/75* (2022.01); *G06V 20/56* (2022.01); *G06T 2207/10004* (2013.01); *G06T 2207/10024* (2013.01);
  (Continued)

(58) Field of Classification Search
  CPC .......... G06N 3/08; G06N 3/04; G06N 3/0454; G06N 3/084; G06K 9/627; G06T 7/73; G06T 7/74; G06T 2207/10004; G06T 2207/10024; G06T 2207/20081; G06T 2207/20084; G06V 10/75; G06V 20/56
  See application file for complete search history.

(56) References Cited

U.S. PATENT DOCUMENTS 6,324,532 B1   11/2001   Spence et al.
9,373,057 B1   6/2016    Erhan et al.
(Continued)

OTHER PUBLICATIONS

Anelia Angelova, Alex Krizhevsky, Vincent Vanhoucke, Abhijit Ogale, and Dave Ferguson, "Real-Time Pedestrian Detection with Deep Network Cascades," Sep. 2015, pp. 32.1-32.12.

*Primary Examiner* — Siamak Harandi
(74) *Attorney, Agent, or Firm* — Fish & Richardson P.C.

(57) ABSTRACT

A neural network system for identifying positions of objects in an input image can include an object detector neural network, a memory interface subsystem, and an external memory. The object detector neural network is configured to, at each time step of multiple successive time steps, (i) receive a first neural network input that represents the input image and a second neural network input that identifies a first set of positions of the input image that have each been classified as showing a respective object of the set of objects, and (ii) process the first and second inputs to generate a set of output scores that each represents a respective likelihood that an object that is not one of the objects shown at any of the positions in the first set of positions is shown at a respective position of the input image that corresponds to the output score.

20 Claims, 8 Drawing Sheets

Related U.S. Application Data continuation of application No. 15/381,288, filed on Dec. 16, 2016, now Pat. No. 10,013,773.

(51) Int. Cl.
  *G06K 9/62* (2022.01)
  *G06N 3/04* (2006.01)
  *G06V 10/75* (2022.01)
  *G06V 20/56* (2022.01)

(52) U.S. Cl.
  CPC .............. *G06T 2207/20081* (2013.01); *G06T 2207/20084* (2013.01)

(56) References Cited

U.S. PATENT DOCUMENTS

| | | |
|---|---|---|
| 10,013,773 B1 | 7/2018 | Ogale et al. |
| 10,769,809 B1 | 9/2020 | Ogale et al. |
| 2014/0104051 A1 | 4/2014 | Breed |
| 2016/0140300 A1 | 5/2016 | Purdie et al. |

NEURAL NETWORKS FOR OBJECT DETECTION

CROSS-REFERENCE TO RELATED APPLICATIONS

This application is a continuation of and claims priority to U.S. application Ser. No. 16/022,901, filed on Jun. 29, 2018, which is a continuation of and claims priority to U.S. application Ser. No. 15/381,288, filed on Dec. 16, 2016. The contents of both applications are incorporated by reference in their entireties.

TECHNICAL FIELD

This specification describes techniques by which a computer-implemented neural network system can identify positions of objects in an image. For example, the system can be deployed on an autonomous or semi-autonomous vehicle to determine the locations of objects in a vicinity of the vehicle.

BACKGROUND

Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. The transformation operations can be characterized by values of internal parameters of the neural network. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture may specify which layers provide their output as input to which other layers and how the output is provided.

In general, the transformation operations of each layer of a neural network are performed by one or more computers at one or more locations that are configured to implement the transformation operations. Thus, a layer being described as performing operations means that the computers implementing the transformation operations of the layer perform the operations.

Neural networks have been trained to perform a range of tasks related to, e.g., speech recognition, language translation, and natural language prediction.

SUMMARY

This specification describes a neural network system that detects objects shown in an image and generates an output that indicates a respective position of one or more of the objects shown in the image. In some implementations, the system is deployed on an autonomous or semi-autonomous vehicle to determine the locations of objects in a vicinity of the vehicle.

Autonomous and semi-autonomous vehicles use computing systems to make driving decisions and to at least partially effect control of the vehicle. A fully autonomous vehicle can include computer-based control systems that make fully autonomous driving decisions to effect fully autonomous control independent of a human driver, whereas a semi-autonomous vehicle can include computer control systems that make semi-autonomous driving decisions to effect semi-autonomous control that aids a human driver. In some implementations, the autonomous or semi-autonomous vehicle is an automobile, e.g., a sedan, a lorry, a pickup truck, a van, a sport utility vehicle, or a motorcycle. In other implementations, the vehicle is a watercraft, e.g., a boat, or an aircraft, e.g., an airplane or helicopter.

Autonomous and semi-autonomous vehicles may include one or more environmental sensing systems that monitor the environment of a vehicle. For example, a light detection and ranging (LIDAR) system, a radio detection and ranging (RADAR) system, a camera subsystem, or a combination of these and other sensing systems, may continuously sweep an area surrounding the vehicle on which the sensing systems are installed, e.g., a vicinity of the vehicle. The sensing systems generate sensor data from the sweeps that characterize aspects of the current environment of the vehicle. In some implementations, the vehicle's computing systems are configured to process sensor data from one or more sensing systems in real-time and to project the data onto a 2D-space to form an image. The image may represent the results of sweeps by one or more sensing systems.

In order to make effective driving decisions, the computing systems of an autonomous or semi-autonomous vehicle may process information derived from sensor data from the vehicle's sensing systems. For instance, an image that projects sensor data onto a 2D space can be processed to identify objects surrounding the vehicle, i.e., perception objects, and their respective locations relative to the vehicle. Such information about objects in the vehicle's vicinity can be used, alone or together with navigation data and other types of data, by control systems of the vehicle to make and effect driving decisions, e.g., steering, acceleration, and braking decisions that allow the vehicle to avoid collisions and safely navigate to a desired destination. For example, the input image may show vehicles, vegetation, pedestrians, infrastructure, and/or other objects in a vicinity of a first vehicle.

As described further below with respect to FIGS. 1-3, a neural network system can process the input image to identify a position of each object shown in the image. The positions of the objects in the image can then be translated to physical locations of the objects in a real-world environment of the vehicle, which can inform driving decisions of the vehicle. Additionally, an object analysis subsystem may use information about the positions of objects shown in an image as a guide for identifying individual objects in the image that can be further analyzed, e.g., to determine a classification of a given object or physical characteristics of the object.

Some implementations of the subject matter disclosed herein include a neural network system for identifying positions of objects in a set of objects shown in an input image. The system can include a detector neural network, an external memory, and a memory interface subsystem.

The detector neural network is configured to, at each time step of multiple successive time steps, (i) receive a first neural network input that represents the input image and a second neural network input that identifies a first set of positions of the input image that have each been classified as showing a respective object of the set of objects, and (ii) process the first neural network input and the second neural network input to generate a set of output scores that each represents a respective likelihood that an object that is not one of the objects shown at any of the positions in the first set of positions is shown at a respective position of the input image that corresponds to the output score. Each output score of the set of output scores corresponds to a different position of a plurality of positions of the input image.

The external memory is configured to store the second neural network input.

The memory interface subsystem is configured to, at each time step in the multiple successive time steps, select a particular position of the plurality of positions of the input image based on the set of output scores generated by the detector neural network at the time step. The selected particular position is not currently among the first set of positions that have been classified as showing respective objects of the set of objects. The memory interface subsystem is further configured to, at each time step, classify the selected particular position of the input image as showing an object of the set of objects shown in the input image. The memory interface subsystem can, at each time step, update the second neural network input stored in the external memory by adding the selected particular position of the input image to the first set of positions identified by the second neural network input.

These and other implementations can optionally include one or more of the following features.

The memory interface subsystem can be configured to, at each time step in the multiple successive time steps, provide the second neural network input stored in the external memory to the detector neural network and receive, from the detector neural network, the set of output scores generated by the detector neural network at the time step.

The detector neural network can be further configured to, at each of one or more time steps in the multiple successive time steps, process the first neural network input and the second neural network input to generate a second output score that represents a likelihood that an object is shown at any of the positions that are not in the first set of positions of the input image.

The neural network system (e.g., the memory interface subsystem) can be configured to determine, at each of the one or more time steps in the multiple successive time steps and based on the second output score, whether to continue identifying positions of objects shown in the input image.

The detector neural network can be a feedforward detector neural network.

The memory interface subsystem can be further configured to, at each time step in the multiple successive time steps, select the particular position of the plurality of positions of the input image based on a comparison of the respective output score for the particular position with the respective output scores for other positions of the plurality of positions of the input image.

The input image can represent signals that were generated by one or more sensors of a vehicle and that characterize an environment in a vicinity of the vehicle.

The neural network system can further include an object analysis subsystem that identifies particular objects in the input image using information about the positions of detected objects stored in the external memory The object analysis subsystem can determine classifications or other characteristics of objects shown in the input image.

At a first time step in the multiple successive time steps, the first set of positions identified by the second neural network input can be a null set that identifies no positions of the input image that have been classified as showing an object. At each time step in the multiple successive time steps that follows the first time step, the first set of positions identified by the second neural network input can specify at least one position of the input image that has been classified as showing an object.

The detector neural network can include a softmax layer. The set of output scores generated by the detector neural network at a given time step can be the current values of the softmax layer that result from processing the first neural network input and the second neural network input at the given time step.

At a given time step after an initial time step in the multiple successive time steps, the first set of positions of the input image identified by the second neural network input can each have been classified as showing a respective object of the set of objects at a respective preceding time step in the multiple successive time steps.

The set of output scores generated by the detector neural network at a given time step can each represent a respective likelihood that an object within one or more pre-defined classes, which is not one of the objects shown at any of the positions in the first set of positions, is shown at the respective position of the input image that corresponds to the output score.

Some implementations of the subject matter disclosed herein include a computer-implemented method for identifying positions of objects in a set of objects shown in an input image. The method can include the following operations for each time step of multiple successive time steps. A neural network system receives a first neural network input that represents the input image. The system receives a second a second neural network input that identifies a first set of positions of the input image that have each been classified as showing a respective object of the set of objects. A detector neural network of the system processes the first neural network input and the second neural network input to generate a set of output scores that each represents a respective likelihood that an object that is not one of the objects shown at any of the positions in the first set of positions is shown at a respective position of the input image that corresponds to the output score. Each output score of the set of output scores corresponds to a different position of a plurality of positions of the input image. A memory interface subsystem of the system selects, based on the set of output scores, a particular position of the plurality of positions of the input image that is not currently among the first set of positions that have been classified as showing respective objects of the set of objects. The selected particular position of the input image is classified as showing an object of the set of objects shown in the input image, including adding the selected particular position of the input image to the first set of positions identified by the second neural network input.

These and other implementations can optionally include one or more of the following features.

For each of one or more time steps in the multiple successive time steps, the detector neural network can process the first neural network input and the second neural network input to generate a second output score that represents a likelihood that an object is shown at any of the positions that are not in the first set of positions of the input image.

The system can determine, at each of the one or more time steps in the multiple successive time steps and based on the second output score, whether to continue identifying positions of objects shown in the input image.

The detector neural network can be a feedforward detector neural network.

Selecting the particular position of the plurality of positions of the input image can include comparing the respective output score for the particular position of the input image with the respective output scores for other positions of the plurality of positions of the input image.

The input image can represent signals that were generated by one or more sensors of a vehicle and that characterize an environment in a vicinity of the vehicle.

Some implementations of the subject matter disclosed herein include a computer-implemented method for training a detector neural network. The method can include obtaining, by a system of one or more computers, a plurality of training data sets. Each training data set can include (i) a first training input that represents an input image that shows a set of objects, (ii) a second training input that identifies a first set of positions, of a plurality of positions of the input image, that each shows a respective object of a first subset of the set of objects shown in the input image, and (iii) a target output that identifies a second set of positions, of the plurality of positions of the input image, that each shows a respective object of the set of objects that is not among the first subset of objects. The system trains the detector neural network on the plurality of training data sets, including, for each training data set of the plurality of training data sets: (i) processing the first training input and the second training input to generate a set of output scores that includes a respective output score for each position of the plurality of positions of the input image, (ii) determining an output error using the target output and the set of output scores; and (iii) adjusting current values of parameters of the detector neural network using the error.

These and other implementations can optionally include one or more of the following features. For each training data set, the second set of positions of the input image identified by the target output can specify every position of the plurality of positions of the input image that shows a respective object of the set of objects that is not among the first subset of objects.

For each training data set, the second set of positions of the input image identified by the target output can specify only one position of the plurality of positions of the input image that shows an object of the set of objects that is not among the first subset of objects.

Some implementations of the subject matter disclosed herein can, in certain instances, achieve one or more of the following advantages. First, by identifying positions of objects shown in an input image in an iterative manner, e.g., by selecting only one image position for a detected object at each time step in a series of time steps, the neural network system may more accurately and consistently identify the positions of all the objects in a set of objects shown in the image. Second, by introducing external memory to the neural network system to store a cumulative list of previously identified positions of objects shown in the input image, the system can use results from preceding time steps to determine an output for a current time step. Typically, recurrent neural networks (RNNs) have been used to maintain state across time steps of an input sequence and to generate an output at a given time step based at least partially on outputs at one or more preceding time steps. However, in some instances, RNNs can be more difficult to train than feedforward neural networks that do not maintain state across time steps, and RNNs may not be well suited for some applications. The external memory of the neural network system can therefore allow the system to employ a feedforward neural network, e.g., an object detector neural network, while still benefiting from the results of previous time steps by using image positions for shown objects that have been identified at preceding time steps to facilitate identification of an image position for another object at a current time step. Moreover, as a feedforward neural network, the object detector neural network may be a smaller model that uses comparatively less storage of a computing system than if the detector neural network were an RNN. Additionally, the object detector neural network may generally use fewer computations to generate an output than if the network were an RNN.

The use of an external (e.g., explicit) memory can be advantageous as compared to RNNs in other respects as well. For example, the external memory does not forget the positions of previously detected objects over time. Even the most sophisticated and well-trained RNNs (e.g., LSTMs), are prone to losing memory over time. Additionally, an external memory tends to generalize better than RNNs to processing longer sequences, which would occur as more objects are shown in an image. For instance, the object detector neural network may learn relatively simple rules during training (e.g., score positions of previously detected objects lower), but these rules are generally readily transferable to longer sequences.

Additional features and advantages will be apparent to a skilled artisan in view of the disclosure contained herein.

DETAILED DESCRIPTION

Figure 1:
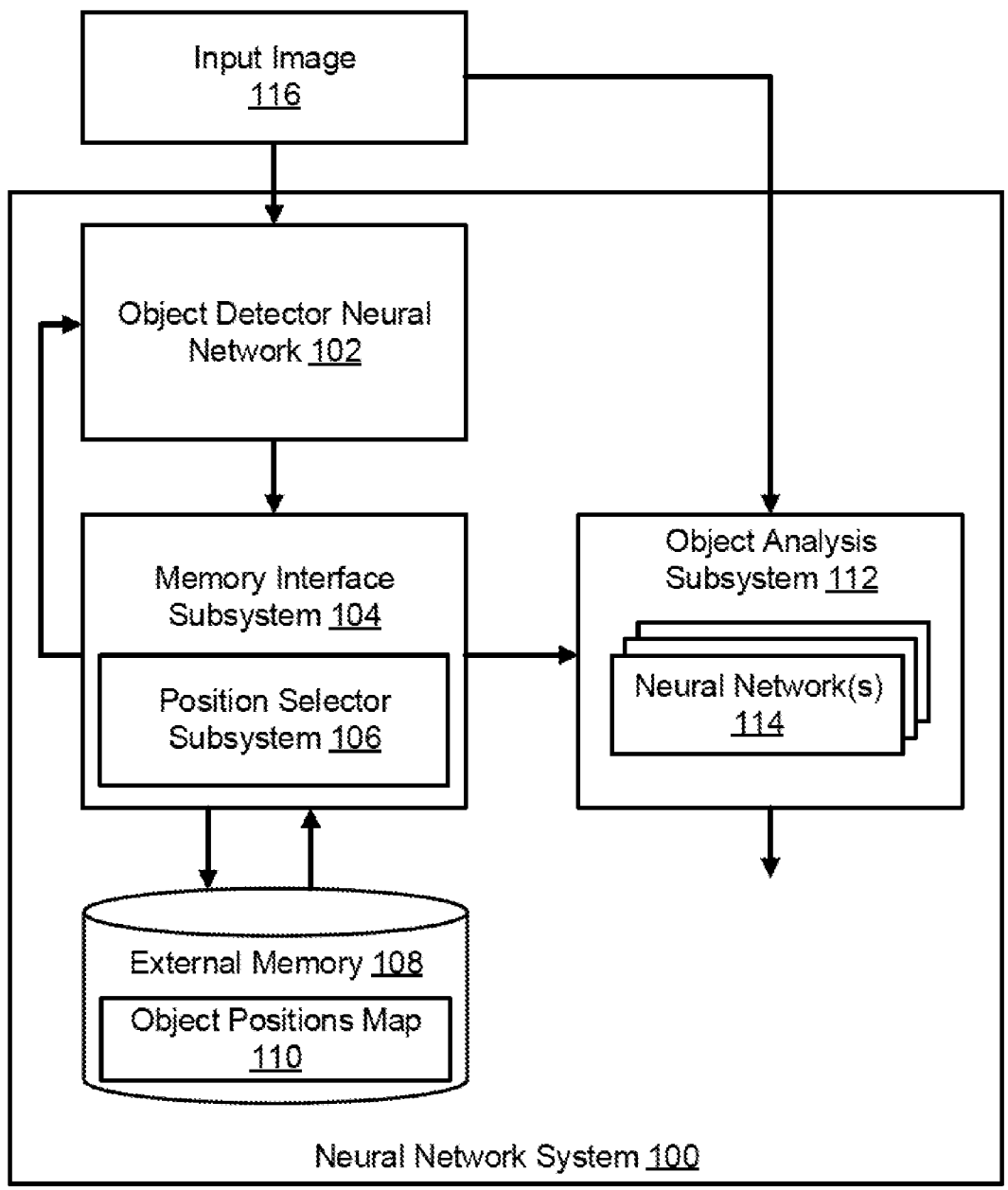
FIG. 1 depicts a block diagram of an example neural network system that identifies positions of objects shown in an input image.

FIG. 1 is a block diagram of an example neural network system 100 for identifying positions of objects shown in an input image 116. The system includes an object detector neural network 102, a memory interface subsystem 104, and an external memory 108. In some implementations, the system 100 further includes an object analysis subsystem 112.

The system 100 can be implemented as computer programs on one or more computers in one or more locations. In some implementations, the system 100 is provided on-board a vehicle, e.g., an autonomous or semi-autonomous vehicle, so that the system 100 travels along with the vehicle. In these implementations, the system 100 may process an input image 116 that has been generated from sensor data produced by one or more environmental sensing systems of the vehicle (e.g., LIDAR, RADAR, camera systems). The system 100 can detect objects shown in the image as being within a defined area surrounding the vehicle, e.g., a vicinity of the vehicle. The system 100 can further identify positions of the objects shown in the input image, which can then be translated to physical locations of the objects in a real-world environment of the vehicle.

The object detector neural network 102 is a machine-learning model that accepts an input and generates an output according to values of internal parameters of the model. The values of the parameters of the neural network 102 are determined during a training procedure in which the network 102 processes many samples of training data and iteratively adjusts the values of the parameters over time using an error between a target output and an output generated by processing a training input in accordance with current values of the parameters. In some implementations, the object detector neural network 102 is a feedforward neural network.

More specifically, the object detector neural network 102 is configured to process a pair of neural network inputs to generate a set of scores that represent information about positions of objects in an input image, e.g., input image 116. The pair of neural network inputs includes a first neural network input that represents the input image 116 and a second neural network input that identifies positions in the image 116 where objects are shown in the image 116. The set of scores generated by the object detector neural network 102 each corresponds to a respective position of a set of positions of the image 116. Each score indicates a likelihood that an object is shown at the respective image position corresponding to the score and, in particular, indicates a likelihood that an object that is shown at the respective image position is not among objects shown at any of the positions identified by the second neural network input.

The input image 116 is an image that shows a set of one or more objects that are detectable by the object detector neural network 102. In some implementations, the input image 116 indicates information about an environment at least partially surrounding a vehicle, e.g., an environment in the vicinity of an autonomous or semi-autonomous vehicle during travel. For example, the input image 116 may be generated based on sensor data captured by one or more sensing systems on the vehicle. The input image 116 may show one, two, or more objects that are detectable by the object detector neural network 102.

In particular, an autonomous or semi-autonomous vehicle may include a combination of components for sensing information about the environment in proximity of a vehicle. For example, a first sensing subsystem may be a light detection and ranging (LIDAR) system that emits and detects reflections of laser light, and a second sensing subsystem may be a radio detection and ranging (RADAR) system that emits and detects reflections of radio waves. Additional sensing subsystems may also be provided on a vehicle, such as a camera system that detects reflections of visible light.

The vehicle may include combinations of two, three, four, or more sensing subsystems, and particular ones of the sensing subsystems may be activated or deactivated at any time during travel of the vehicle. In some instances, the vehicle may include two or more sensing subsystems of the same type (e.g., two or more LIDAR systems, two or more RADAR systems, two or more camera systems), although each subsystem is configured differently from each other. For example, the first sensing subsystem may be a short-range LIDAR system that senses information about an environment in close proximity to the vehicle, whereas the second sensing subsystem may a longer-range LIDAR system that senses information about the environment at a further distance from the vehicle.

In some implementations, all or some of the sensing subsystems are configured to run continuously and concurrently during travel of a vehicle. At any given time, the sensing subsystems may make multiple channels of sensor data available to the neural network system 100 that each represents a current condition of the environment of the vehicle, including any objects in the environment, according to signals captured by one or more sensors of the respective sensing subsystem.

The sensing subsystems output sensor data that indicates, for example, a distance of reflected radiation (e.g., laser light, radio waves, or visible light) a direction of the reflected radiation, an intensity of the reflected radiation, or a combination of these. A given sensing subsystem can transmit one or more pulses of electromagnetic radiation in a particular direction and can measure the intensity of any reflections as well as the elapsed time between emitting the radiation and receiving the reflective signal. A distance between an object in the environment and the current position of the vehicle can be determined based on the elapsed time between emitting the radiation and receiving the reflective signal. The sensing subsystems can each continually sweep a particular space in angle, azimuth, or both. Sweeping in azimuth, for example, can allow a sensing subsystem to detect multiple objects along a same line of sight.

In some implementations, the input image 116 is a 2D projection of sensor data for a partial sweep, a single sweep, or multiple sweeps one or more sensing subsystems. In this manner, the extent of the image 116 may correspond to a physical environment surrounding the vehicle. For example, the center of the image 116 may correspond to the location of the sensing subsystems, e.g., at a center of the vehicle. The top of the image 116 may correspond to a physical location at a particular distance in front of the vehicle, the bottom of the image 116 may correspond to a physical location at a particular distance behind the vehicle, the left of the image 116 may correspond to a physical location at a particular distance to the left of the vehicle, and the right of the image 116 may correspond to a physical location at a particular distance to the right of the vehicle. Thus, for example, another vehicle that is driving in front of the autonomous or semi-autonomous vehicle may be shown as an object toward the top of the image 116, and a pedestrian that is walking behind the vehicle may be shown as an object toward the bottom of the image 116.

In some implementations, the image 116 can be segmented into smaller portions and a respective positional identifier is assigned to each portion of the image 116. For example, different portions of the image 116 may be uniquely identified using positional identifiers that indicate the particular horizontal location and the particular vertical location of the portion in the image 116. Thus, if a 200×200 grid were applied to the image 116, any of the 40,000 segments (regions) of the image 116 could be identified by a positional identifier containing a pair of coordinates for the horizontal and vertical location of the segment. As such, the location of an object in the input image 116 can be specified using a positional identifier that corresponds to the particular segment of the image 116 that shows the object. In some implementations, if a given object spans multiple segments of the input image 116, then the position of the object in the image 116 is specified using a positional identifier that corresponds to the particular segment of the image 116 that shows the center portion of the object.

The first neural network input that the object detector neural network 102 is configured to process can be the input image 116 or can be derived from the input image 116. For example, the first neural network input may be features of the input image 116 that characterize the input image 116.

As previously mentioned, the object detector neural network 102 is configured to generate an output by processing the first neural network input representative of the input image 116 and a second neural network input that represents an object positions map 110 that identifies a set of positions of the input image 116 for none, one, or more objects shown in the input image 116. The object positions map 110 may identify none, one, or more positions of the image 116. The identified positions can be positions that are classified as object-showing positions, i.e., positions at which an object is shown in the image 116. Then, by processing the first neural network input representative of the input image 116 and the second neural network input representative of the object positions map 110, the object detector neural network 102 outputs a set of scores that indicate likelihoods that any objects are shown at positions of the input image that are different from those positions already identified in the object positions map 110. In particular, each score in the set of scores may correspond to a respective position of the image 116 and indicate a likelihood that an object is shown at the respective position different from the positions identified in the map. Thus, if an object is shown at a particular position, and the position is not already identified in the map 110, then the respective score that the network 102 outputs for the particular position may indicate a high likelihood of an eligible object being shown at the particular position. If no object is shown at the particular position, or if an object is shown at the particular position but the particular position is already identified in the object positions map 110, then the respective score that the detector neural network 102 generates for the particular position may indicate a low likelihood of an eligible object being shown at the position.

In some implementations, the positions identified in the object positions map 110 are positions that show objects that have previously been detected in the image 116. For instance, at a first time step, the detector neural network 102 may identify that an object is shown at a first position of the image. The first position may then be added to the object positions map 110 to classify it as an object-showing position. Any other detectable objects shown in the image that are not shown at positions identified by the object positions map 110 are referred to collectively as a complementary set of objects. Thus, objects shown at positions identified by the object positions map 110 may form a first set of objects, and objects shown at positions that are not identified by the object positions map 110 form a complementary set of objects to the first set of objects. In this example, the network 102 may thus generate a set of output scores that each corresponds to a respective position of the image 116 and that indicates a likelihood that an object from only the complementary set of objects is shown at the respective position.

It is possible in some instances that the object positions map 110 identifies positions of the input image that do not actually show an object, and therefore the output scores do not truly indicate the likelihoods of each position showing an object in a complementary set of objects. More precisely, the output scores indicate for each particular position a respective likelihood that any object that is not shown at one of the positions identified by the object positions map 110 is shown at the particular position. Nonetheless, for simplicity, this specification sometimes refers to the term complementary set of objects by way of example. It will be appreciated, however, that the disclosed techniques also extend to circumstances where the set of eligible objects, i.e., objects shown at positions other than positions identified by the object positions map 110, do not form a true complementary set (e.g., if the object positions map 110 identifies positions that do not actually show an object).

As an example, consider an input image 116 that has a set of regions defined by a 5×5 rectangular grid. Each region is identified by a respective positional identifier, which may be a coordinate pair or a unique number for the region, e.g., an integer in the range 1-25. The image 116 may show three objects A, B, and C in the vicinity of a vehicle. The objects A, B, and C are shown in regions of the input image 116 that are assigned positional identifiers 3, 9, and 15 (among possible positional identifiers 1-25), respectively. For instance, object A may be shown in a region positioned near the top left of the image 116, object B may be shown in a region positioned near the center of the image 116, and object C may be shown in a region positioned near the bottom center of the image 116. The object positions map 110 may identify image position 9 as a position that shows an object in the image 116, but the map 110 may be incomplete in that it does not also identify positions 3 and 15, which show objects A and C, respectively. The neural network system 100 provides a first neural network input that represents the image 116 and a second neural network input that represents the object positions map 110 (i.e., that represents the set of positions identified by the object positions map 110) as inputs to the object detector neural network 102. The object detector neural network 102 then processes these inputs and generates a set of scores, where each score indicates a respective likelihood that any object that is not shown at a position identified by the object positions map 110 (i.e., objects A and C) is shown in a respective region of the image 116 that corresponds to the score. Thus, if the network 102 is trained such that a higher score indicates a higher likelihood, then the set of scores generated by the network 102 in this example would include relatively higher scores for regions 3 and 15 of the image 116, and relatively lower scores for other regions of the image 116, including region 9 that shows object B, since this region was identified in the second neural network input representative of the object positions map 110.

In some implementations, the neural network system 100 uses the object detector neural network 102 to determine the respective position of each detectable object shown in the input image 116. Rather than determining the positions of every object shown in the input image 116 at once, the system 100 can instead identify the positions one at a time over a series of time steps.

To this end, the system 100 includes an external memory 108 and a memory interface subsystem 104. The external memory 108 includes one or more computer-readable storage devices that are configured to store an object positions map 110 for the input image 116. The memory interface subsystem 104 is a controller that communicates with both the object detector neural network 102 and the external memory 108 and provides an interface between these components. The memory interface subsystem 104 can read the object positions map 110 from the external memory 108 and can write to the external memory 108, e.g., to create or update the object positions map 110.

The system 100 identifies positions of a set of objects shown in the input image 116 generally as follows. When the system 100 receives a new input image 116 that is to be processed, the memory subsystem 104 generates an object positions map 110 for the input image 116. Initially, the object positions map 110 identifies no positions of the image 116 that have been classified as showing an object, because the system 100 has not yet detected the positions of any objects in the image 116. The memory interface subsystem 104 may also pre-process the input image 116 to generate a first neural network input that represents the input image 116. The memory interface subsystem 104 then provides the first neural network input and a second neural network input that identifies the set of any positions from the object positions map 110 that have been classified as showing an object. The object detector neural network 102 processes the inputs and generates a set of output scores that indicate respective likelihoods of each image position showing an object in the complementary set of object, i.e., respective likelihoods of each image position showing any object not located any of the positions identified by the second neural network input. In some implementation, the object detector neural network 102 generates the scores using a softmax layer that processes the output of a last hidden layer of the network 102 that precedes the softmax layer.

Once the object detector neural network 102 has generated the scores, the memory interface subsystem 103 reads the scores from the network 102 and uses a position selector subsystem 106 to select one or more of the scores based on certain criteria. In some implementations, the position selector subsystem 106 uses an argmax function to select the top n scores generated by the object detector neural network 102, where n is 1, 2, 3, 4, or more. For n=1, the position selector subsystem 106 selects only the top score of the set of scores. The memory interface subsystem 104 then classifies, e.g., designates, the respective positions of the input image 116 that correspond to the selected scores as object-showing positions, i.e., positions at which an object is detected to be shown in the input image 116. The memory interface subsystem 104 then writes to the external memory 108 to update the object positions map 110 by adding the selected positions to the set of object showing positions identified by the map 110.

The neural network system 100 repeatedly performs the foregoing operations to identify additional objects one or more at a time until all the objects shown in the input image 116 have been identified and their respective positions classified in the object position map 110. At each successive time step, i.e., iteration, one or more additional objects are added to the object positions map 110, and therefore the complementary set of objects that are shown at positions in the input image 116 that remain to be classified becomes successively smaller at each successive time step.

In some implementations, the system 100 determines when to stop searching for objects in the image 116 using a second output of the object detector neural network 102. The second output can be distinct from the set of scores that the network 102 generates at each time step. The second output can be a value that indicates a likelihood that the complementary set of objects at a given time step is a null set, i.e., the likelihood that any additional objects are shown in the input image 116 at positions that have not yet been classified as object-showing positions in the object positions map 110. At each time step, the system 100 compares the value of the second output from the object detector neural network 102 to a threshold value. A value of the second output that meets the threshold value can indicate that additional objects are shown in the image at positions that have not yet been classified as object-showing positions in the object positions map 110. Accordingly, the memory interface subsystem 104 selects to add the positions corresponding to the top n scores from the set of scores generated at the time step to the object positions map 110. In contrast, if the value of the second output does not meet the threshold value, this condition can indicate that no additional objects are shown in the image at positions that have not yet been classified as object-showing positions in the object positions map 110. In this condition, the memory interface subsystem 104 may select not to add the positions corresponding to the top n scores from the set of scores generated at the time step to the object positions map 110.

In some implementations, a higher value for a second output indicates a greater likelihood that additional objects are shown in the input image 116 at positions that have not yet been classified as object-showing positions in the object positions map 110. Thus, if the value of the second output is greater than the threshold value, the memory interface subsystem 104 selects to add the positions corresponding to the top n scores from the set of scores generated at a current time step to the object positions map 110. If the value of the second output is less than the threshold value, the memory interface subsystem 104 selects not to add the positions corresponding to the top n scores from the set of scores generated at the time step to the object positions map 110.

In other implementations, a lower value for a second output of the object detector neural network 102 indicates a greater likelihood that additional objects are shown in the input image 116 at positions that have not yet been classified as object-showing positions in the object positions map 110. That is, in these implementations, a higher value for the second output indicates a greater likelihood that no additional objects are shown in the input image 116 at positions that have not yet been classified as object-showing positions in the object positions map 110. Thus, if the value of the second output is less than the threshold value, the memory interface subsystem 104 selects to add the positions corresponding to the top n scores from the set of scores generated at a current time step to the object positions map 110. If the value of the second output is greater than the threshold value, the memory interface subsystem 104 selects not to add the positions corresponding to the top n scores from the set of scores generated at the time step to the object positions map 110.

The neural network system 100 can further include an object analysis subsystem 112. The object analysis subsystem 112 can perform additional processing on the image 116, or on other representations of sensor data generated by a vehicle's sensing systems, to analyze one or more of the objects shown in the image 116. For example, the object analysis subsystem 112 may include neural networks 114 that are trained to generate a classification for each object shown in the image 116 that indicates an object's type (e.g., pedestrian, vehicle, vegetation, building, traffic cone), to generate an indication of an object's physical characteristics (e.g., color, size), or to perform a combination of these and other forms of processing. Navigation and control systems on an autonomous or semi-autonomous vehicle can then use information generated by the object analysis subsystem 112 and the object positions map 110 to make driving decisions for the vehicle, e.g., driving decisions that allow the vehicle to avoid collisions with surrounding objects and to safely travel to a desired destination.

In some implementations, the object analysis subsystem 112 uses the object positions map 110 to facilitate analysis of individual objects. For instance, the object analysis subsystem 112 may use the set of classified object-showing positions identified in the object positions map 110 to identify the location of objects shown in the input image 116 and to identify objects that are candidates for further processing. The memory interface subsystem 104 may provide the object positions map 110 for a given input image 116 to the object analysis subsystem 112 on request or may push the image 116 to the object analysis subsystem 112 on a regular basis, e.g., at every time step, at predetermined intervals, or after positions for all the objects shown in the input image 116 have been identified.

Referring to FIGS. 2A-2E, conceptual illustrations are shown of an object detector neural network 202 in a neural network system identifying respective positions of a set of objects 210-218 shown in an input image 204 over successive time steps $t_0$-$t_5$. The object detection neural network 202 is a detector neural network such as object detector neural network 102 of FIG. 1. The input image 204 can be any suitable image showing one or more objects that are detectable by the object detection neural network 202. In some implementations, the image 204 is a 2D-projected representation of sensor data generated by one or more sensing systems on an autonomous or semi-autonomous vehicle. For example, the image 204 may characterize the environment in a vicinity of a vehicle based on sweeps made by a LIDAR sensing system, a RADAR sensing system, a camera system, or a combination of these sensing systems on an autonomous or semi-autonomous vehicle. The objects 210-218 may be objects located in the vicinity of the vehicle, e.g., a pedestrian, another vehicle, a road sign, a building, or foliage.

Starting at time step $t_0$ (FIG. 2A), the object detection neural network 202 processes a first neural network input that represents the image 204 and a second neural network input 206a that represents an object positions map. The object positions map identifies a set of positions that the system has previously classified as object-showing positions, i.e., positions of the image 204 at which an object is shown in the image 204. In some implementations, an object-showing position is the position of the image 204 that shows the center of an object, e.g., if the object is relatively large and spans more than one position in the image. At the initial time step $t_0$, no object-showing positions in the image 204 have yet been identified by the system. Therefore, the second neural network input 206a is shown as a blank canvas to represent the null set of object-showing positions.

The object detection neural network 202 generates output 208a based on processing the first and second neural network inputs 204 and 206a. Generally, the output 208a identifies a set of positions for objects that are complementary to the set of objects shown at any of the positions identified by the object positions map, i.e., identified by the second neural network input 206a. Here, because the second neural network input 206a identified no object-showing positions, the output 208a identifies the positions A-E for all of the objects 210-218 shown in the input image 204. More precisely, the output 208a is a set of scores that includes a respective score for each position in a set of positions of the image 204. The respective score for each position indicates a likelihood that an object in the complementary set of objects is shown at the position. Thus, the output scores in output 208a for positions A-E of the image 204 may indicate relatively high likelihoods of objects in the complementary set being located at these positions. In contrast, the output scores in output 208a for positions other than positions A-E of the image 204 may indicate relatively low likelihoods of objects in the complementary set being located at these positions.

Figure 2A:
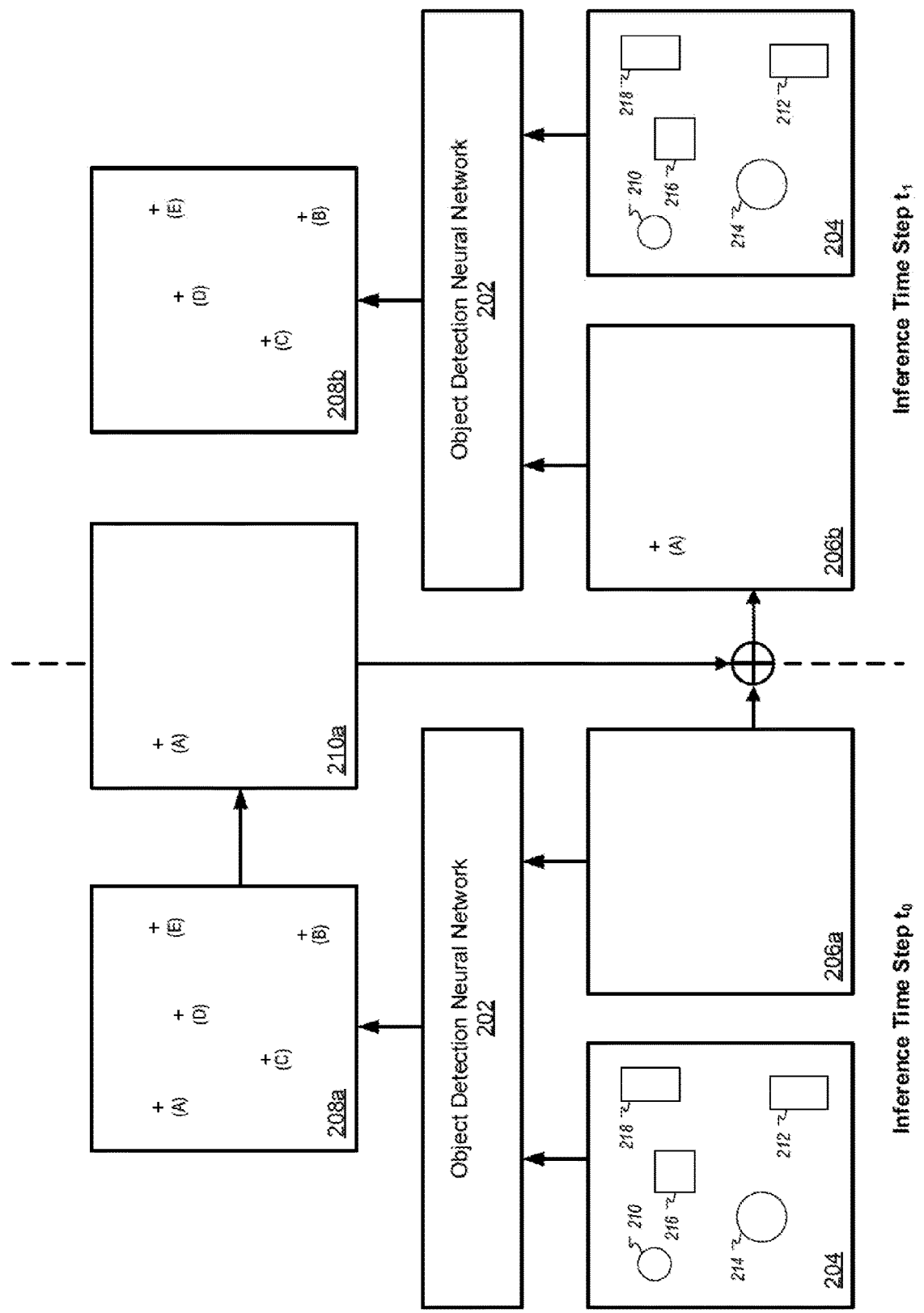
FIGS. 2A-2E illustrate use of an object detector neural network to iteratively identify positions of objects shown in an input image over a series of time steps.
Figure 2B:
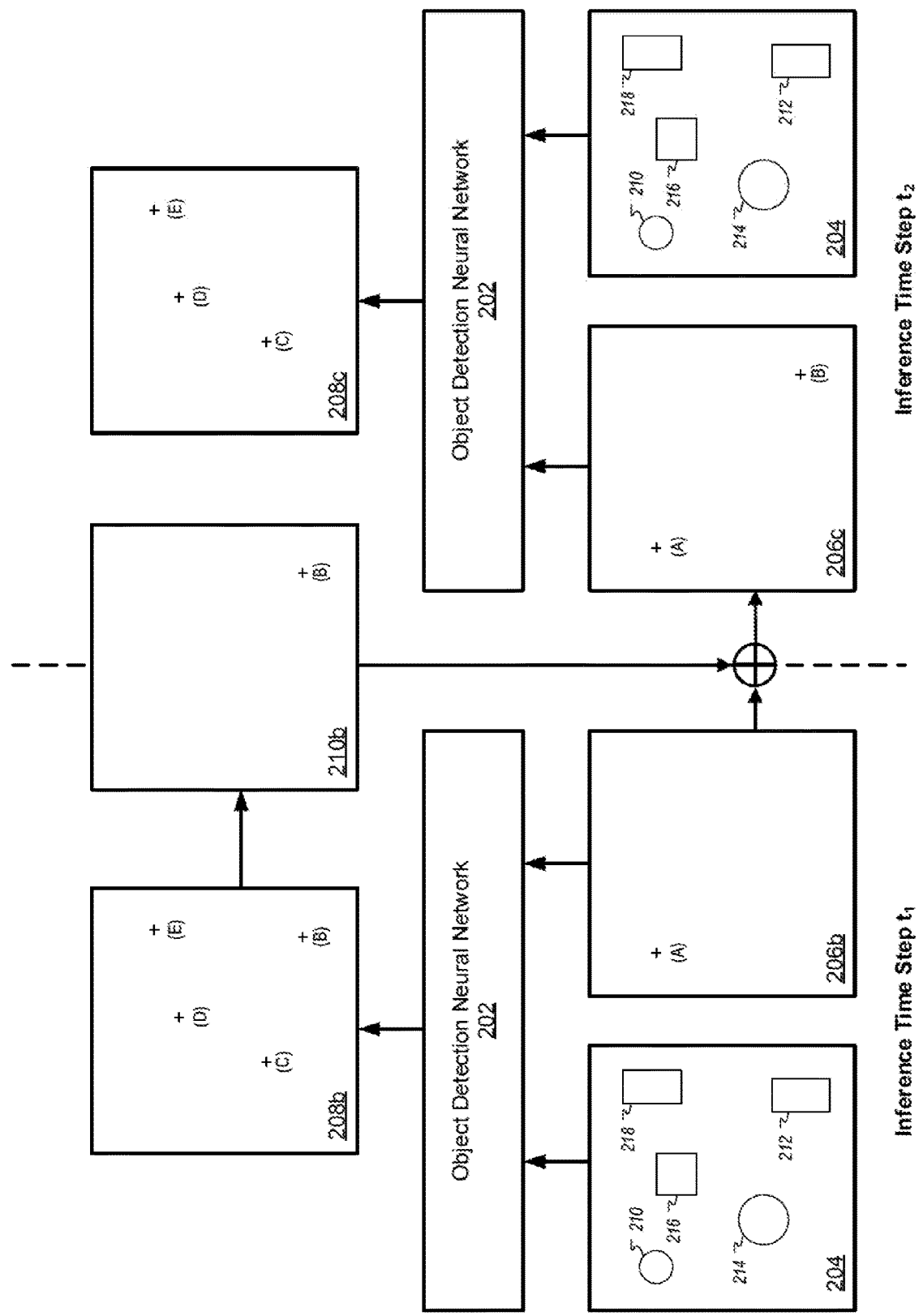
Figure 2C:
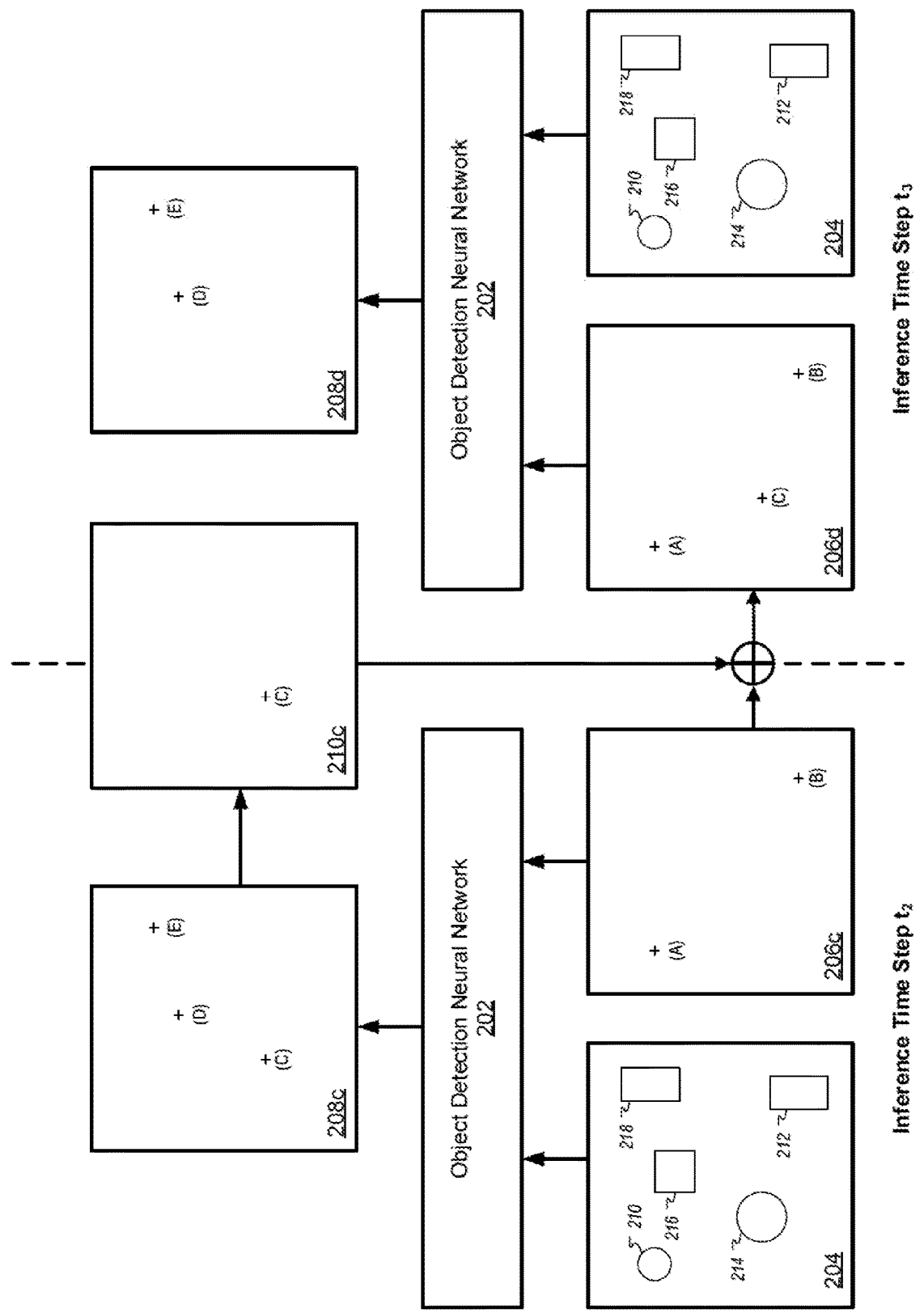
Figure 2D:
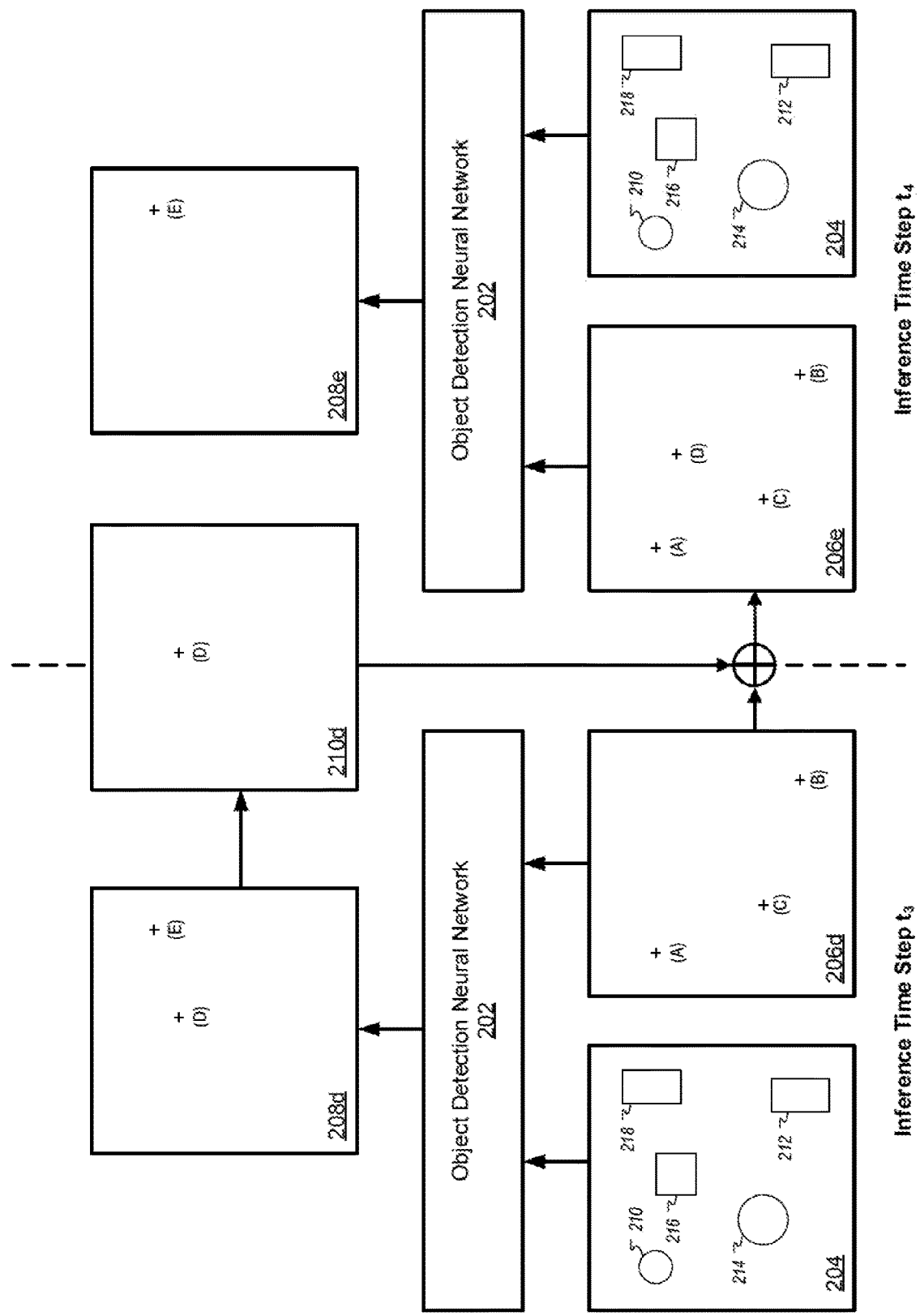
Figure 2E:
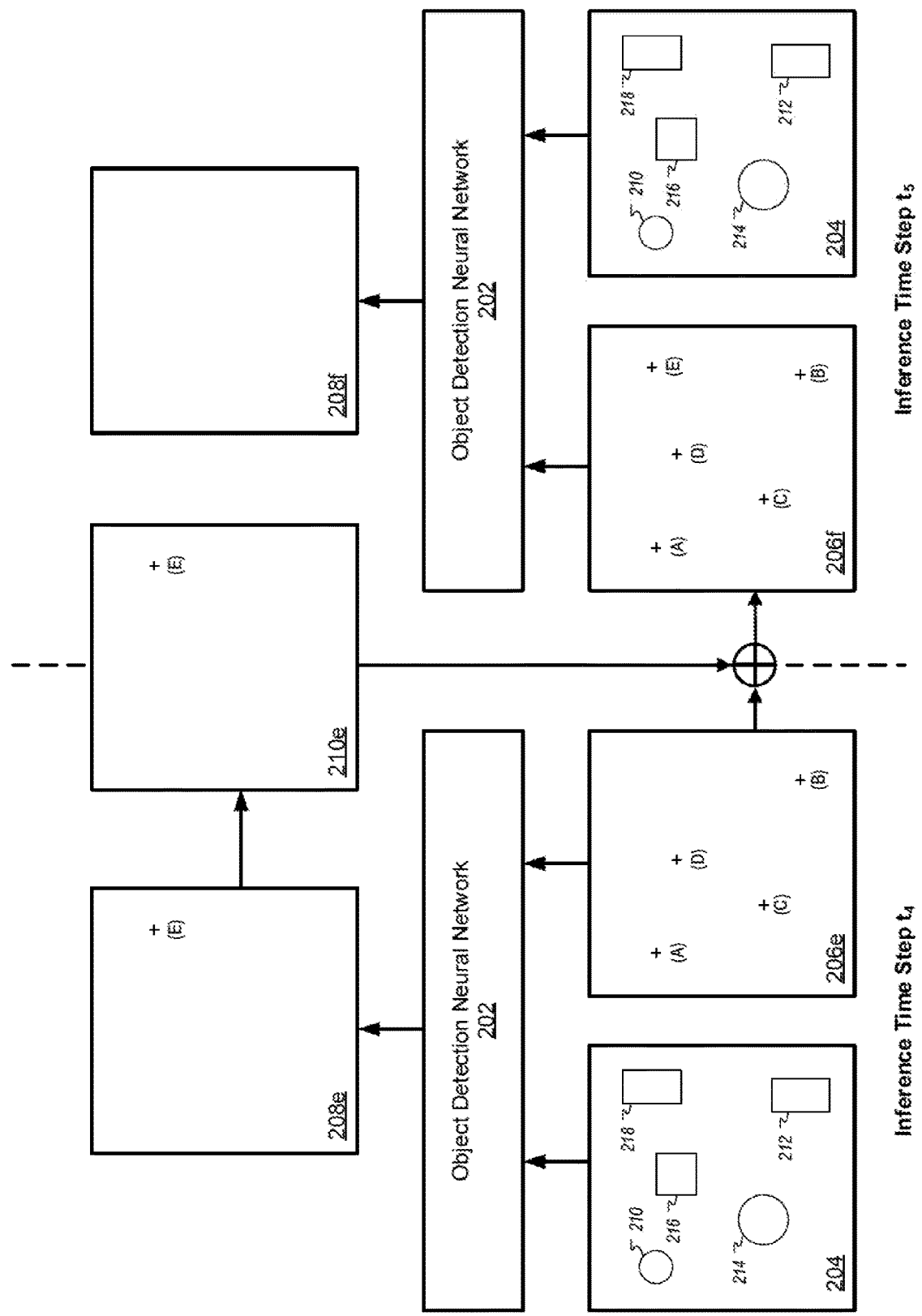

Next, a memory interface subsystem (not shown) uses the output 208a to select one position of the input image 204 to classify as an object-showing position and to add to the set of object-showing positions identified by the object positions map. In some implementations, the selected position is the position that corresponds to a score from output 208a that indicates the greatest likelihood of showing an object in the complementary set of objects (e.g., the highest score of all the scores from output 208a). In the example of FIG. 2A, the memory interface subsystem has selected position A (shown in 210a) to classify as an object-showing position and add to the object positions map. Thus, the second neural network input 208b for time step $t_1$ represents a updated version of the object positions map that identifies position A as a previously classified object-showing position.

The system can repeat operations at time steps $t_1$-$t_5$ similar to those described with respect to time $t_0$ to identify the remaining object-showing positions B-E corresponding to objects 212-218 shown in image 204. For instance, at time step $t_1$ (FIG. 2B), the object detection neural network 202 processes a first neural network input that represents input image 204 and a second neural network input 206b that represents the current object positions map, which identifies any positions of the image 204 that have been classified as object-showing positions at preceding time step $t_0$. Further at time $t_1$, the object positions map identifies position A as having been classified as an object-showing position. The object detection neural network 202 generates output 208b that indicates a high likelihood of objects in the complementary set of objects being located at positions B-E. The memory interface subsystem uses output 208b to select image position B (shown at 210b) and classify it as an object-showing position in the object positions map.

At time step $t_2$ (FIG. 2C), the object detection neural network 202 processes a first neural network input that represents input image 204 and a second neural network input 206c that represents the current object positions map, which identifies any positions of the image 204 that have been classified as object-showing positions at preceding time steps $t_0$ and $t_1$. Further at time $t_2$, the object positions map identifies positions A and B as having been classified as object-showing positions. The object detection neural network 202 generates output 208c that indicates a high likelihood of objects in the complementary set of objects being located at positions C-E. The memory interface subsystem uses output 208c to select image position C (shown at 210c) and classify it as an object-showing position in the object positions map.

At time step $t_3$ (FIG. 2D), the object detection neural network 202 processes a first neural network input that represents input image 204 and a second neural network input 206d that represents the current object positions map, which identifies any positions of the image 204 that have been classified as object-showing positions at preceding time steps $t_0$-$t_2$. Further at time $t_3$, the object positions map identifies positions A, B, and C as having been classified as object-showing positions. The object detection neural network 202 generates output 208d that indicates a high likelihood of objects in the complementary set of objects being located at positions D and E. The memory interface subsystem uses output 208d to select image position D (shown at 210d) and classify it as an object-showing position in the object positions map.

At time step $t_4$ (FIG. 2E), the object detection neural network 202 processes a first neural network input that represents input image 204 and a second neural network input 206e that represents the current object positions map, which identifies any positions of the image 204 that have been classified as object-showing positions at preceding time steps $t_0$-$t_3$. Further at time $t_4$, the object positions map identifies positions A, B, C, and D as having been classified as object-showing positions. The object detection neural network 202 generates output 208e that indicates a high likelihood of a complementary object being located at position E. The memory interface subsystem uses output 208e to select image position D (shown at 210e) and classify it as an object-showing position in the object positions map.

At time step $t_5$ (FIG. 2E), the object detection neural network 202 processes a first neural network input that represents input image 204 and a second neural network input 206f that represents the current object positions map, which identifies any positions of the image 204 that have been classified as object-showing positions at preceding time steps $t_0$-$t_4$. Further at time $t_5$, the object positions map identifies positions A, B, C, D, and E as having been classified as object-showing positions. The object detection neural network 202 generates output 208f, which may not indicate a high likelihood of any complementary objects being shown in the input image 204. Accordingly, the system determines that all the objects shown in the image 204 have been detected and their positions added to the object positions map. The system refrains from performing further iterations in response to determining that all the objects shown in the input image have been located.

In some implementations, the neural network detector 202 generates a second output that indicates a likelihood that the complementary set of objects at a given time step is a null set, i.e., the likelihood that any additional objects (or a likelihood that no additional objects) are shown in the input image 204 at positions that have not yet been classified as object-showing positions in the object positions map. The system may refrain from performing further iterations to identify additional objects in the image 204 if a value of the second output does not meet a threshold value.

Figure 3:
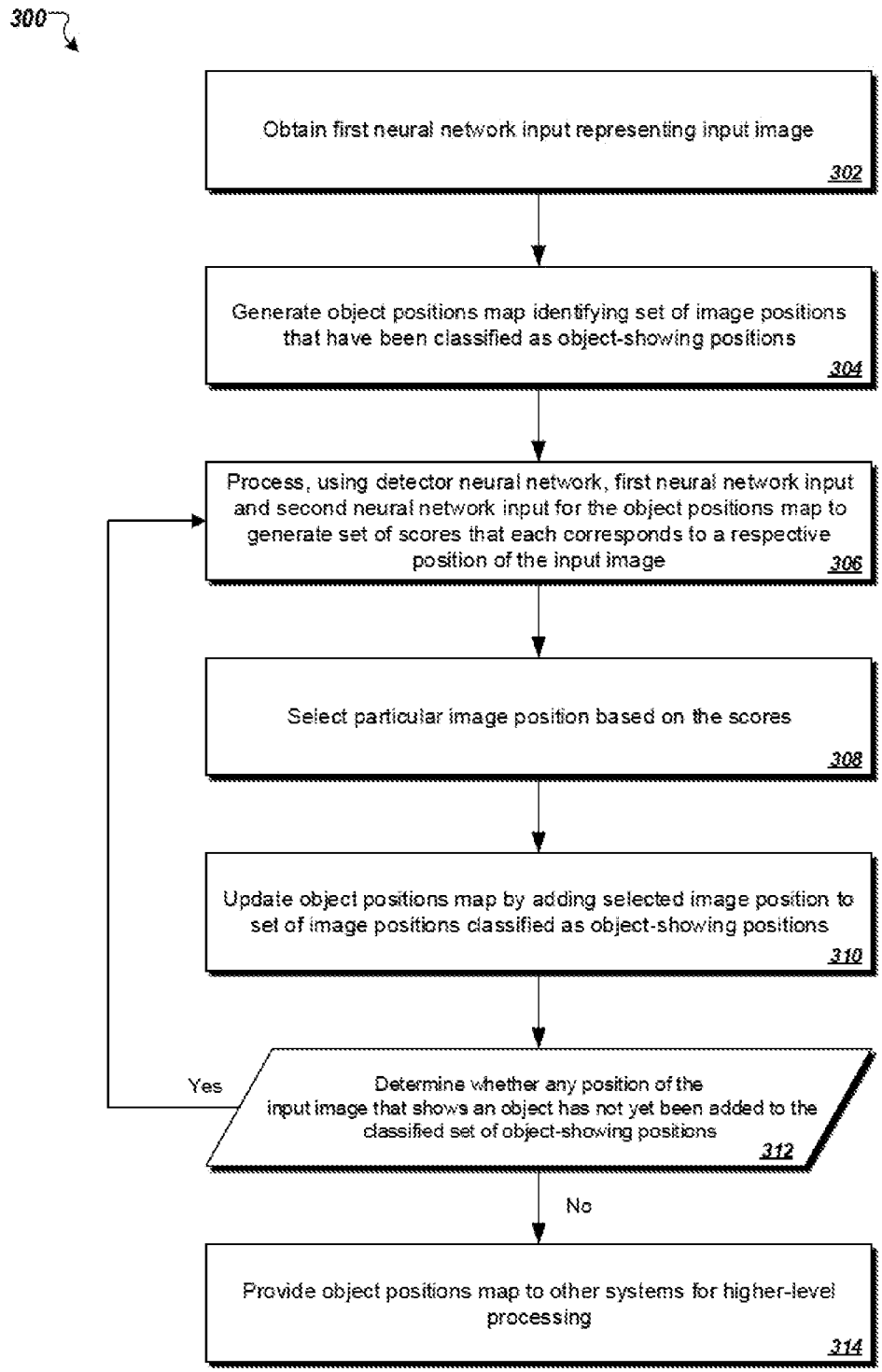
FIG. 3 depicts a flowchart of an example process for identifying, using a neural network system, positions of objects shown in an input image.

FIG. 3 is a flowchart of an example process 300 for identifying positions of a set of objects shown in an image using a neural network system, e.g., neural network system 100. In some implementations, a neural network system provided on an autonomous or semi-autonomous vehicle may carry out the process 300 in order to determine the positions of objects in a vicinity of the vehicle, which information may then be used by an object analysis subsystem or navigation and control subsystems of the vehicle to make and effect various driving decisions.

At stage 302, the system obtains a first neural network input. The first neural network input can represent an image that shows objects that are to be located by the system in subsequent stages of the process 300.

At stage 304, the system generates an object positions map. The object positions map identifies a set of objects that are shown in the image. The process 300 can be an iterative process performed over a series of time steps, and the object positions map may be updated at each iteration. In some implementations, the object positions map at a given time step identifies positions only for any objects that have been identified at any preceding time steps of the process 300. At the initial time step when the system begins the iterative process 300, the object positions map may include a respective value for each position of a set of positions of the input image that indicates the position has not been classified as an object-showing position. In subsequent time steps, as image positions that show objects are identified, the number of positions identified by the object positions map may increase, e.g., until the map identifies the positions of all the objects shown in the image.

At stage 306, the first neural network input and a second neural network input that represents the current object positions map are provided to an object detector neural network, e.g., object detector neural networks 102 or 202. The object detector neural network processes the first neural network input and the second neural network input to generate a set of scores. Each score in the set of scores corresponds to a respective position of the input image and indicates a likelihood that the respective position shows any object that is not shown at any of the positions identified by the current object positions map. In some implementations, the set of scores is generated using a softmax function by a softmax layer of the object detector neural network.

At stage 308, a position selector subsystem classifies one or more positions of the input image as object-showing positions, i.e., positions at which respective objects are shown in the image. The classified position(s) can be selected based on the set of scores that were generated as output by the object detector neural network. For example, the position selector subsystem may select the n (e.g., 1, 2, 3, or more) positions of the input image having scores that indicate the highest likelihoods of being positions where objects in the image are shown, other than positions that have previously been classified as object-showing positions.

At stage 310, a memory interface subsystem writes to an external memory where the object position map is stored to update the object positions map. The memory interface subsystem may update the object positions map by adding the image positions that were selected and classified as object-showing positions at stage 308 to the existing set of positions identified by the object positions map.

At stage 312, the system determines whether any positions of the input image that show a detectable object has not yet been classified as an object-showing position and added to the object positions map. A detectable object is generally any type of object that the object detector neural network has been trained to identify positions of. In some implementations, the object detector neural network may be configured to identify positions of a wide range of objects such as vehicles, pedestrians, buildings, traffic signs, and vegetation. In other implementations, the object detector neural network may be configured to identify positions of only certain types of objects, e.g., vehicles in the proximity of a first vehicle.

The system can use the value of a second output of the object detector neural network to determine whether any positions of the input image that show a detectable object has not yet been classified as an object-showing position and added to the object positions map. The second output is distinct from the set of scores that correspond to the set of positions for the input image. Rather, the value of the second output may indicate a likelihood that the image actually shows any objects that are not among the objects shown at the positions identified by the object positions map. If the value of the second output meets a threshold, then the system determines that the additional objects are shown at positions that are yet to be classified as object-showing positions. The process 300 then returns to stage 306 to perform another iteration and identify the positions of one or more additional objects shown in the image. But if the value of the second output does not meet the threshold, then the system determines that no additional objects are shown at positions that have not been previously classified as object-showing positions. In this case, the system refrains from further iterations to identify additional objects, but instead processes the final object positions map that identifies positions of all the detectable objects shown in the image to complete the process 300. In some implementations, the final object positions map is stored or provided to other systems or subsystems of the vehicle such as the object analysis subsystem (stage 314).

Figure 4:
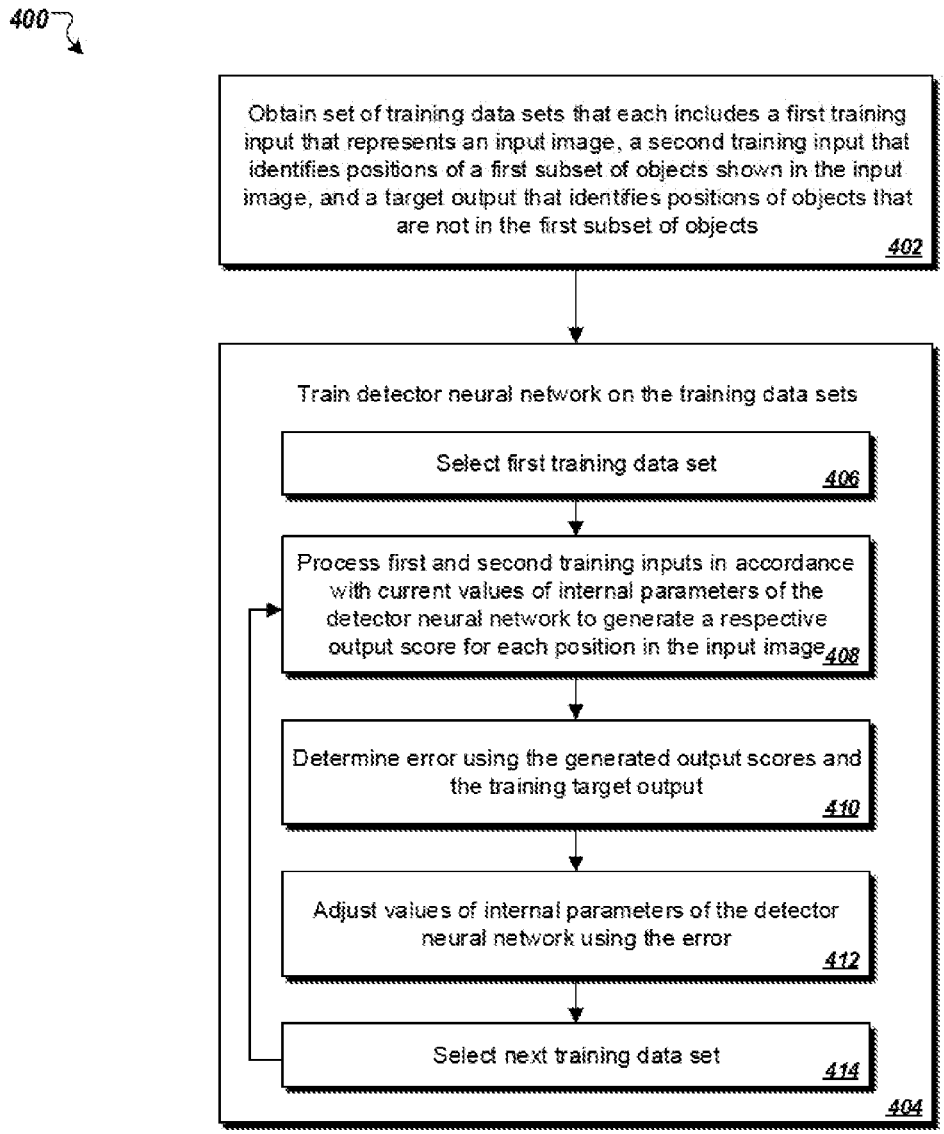
FIG. 4 depicts a flowchart of an example process for training an object detector neural network that can identify positions of objects shown in an input image.

FIG. 4 depicts a flowchart of an example process 400 for training an object detector neural network that can identify positions of objects shown in an input image. Once trained, the object detector neural network can be deployed in a neural network system, e.g., neural network system 100 of FIG. 1. The process 400 can be carried out by a training system, which may include one or more computers provided in one or more locations.

In general, the object detector neural network can be trained by processing many samples of training data using the object detector neural network and, for each sample, adjusting the values of internal parameters of the network using an error between the predicted output generated by the network and a target output specified in the training sample.

At stage 402, the training system obtains a set of training data sets (e.g., hundreds, thousands, or millions of training data sets). Each training data set includes a first training input, a second training input, and a target output. The first training input is a representation of an image that shows one or more objects, i.e., the first training input may be the image itself or features of the image. For example, the image may indicate information about an environment in the vicinity of an autonomous or semi-autonomous vehicle, including information about objects located in the vicinity of the vehicle. In some implementations, the image represented by the first training inputs in all of the training data sets are different from each other. In other implementations, some of the training data sets may include identical first training inputs that represent the same image.

The second training input is an object positions map that identifies, none, one, or more positions of the image from the first training input at which respective objects are shown in the image. For some training data sets, the object positions map does not identify positions of any objects shown in the respective images represented by the first training inputs for these training data sets. For some training data sets, the object positions map identifies positions for a proper subset of all the objects shown in the respective images represented by the first training inputs for these training data sets. For some training data sets, the object positions map identifies positions for all of the objects shown in the respective images represented by the first training inputs for these training data sets.

The training target outputs of the training data sets represent the desired output of the object detector neural network that should result from processing the respective first and second training inputs of the training data sets. Two variations of training target outputs are contemplated. In the first variation, the respective training target output for each training data set identifies the position of every object shown in the image represented by the respective first training input that is not among the set of objects located at positions of the image identified by the object positions map of the respective second training input for the training data set. For example, if the image for a given training data set shows four different objects and the second training input, i.e., the object positions map, identifies the position of just one of the four objects, then the training target output may identify the respective positions of the remaining three objects shown in the image. In the second variation, the respective training target output for each training data set identifies the position of only one object shown in the image represented by the respective first training input that is not among the set of objects located at positions of the image identified by the object positions map of the respective second training input for the training data set. For example, if the image for a given training data set shows four different objects and the second training input, i.e., the object positions map, identifies the positions of just two of the four objects, then the training target output may identify the position of only one of the remaining two objects shown in the image that are not identified by the object positions map. In some implementations for the second variation of target outputs, the particular position identified by the target output is randomly selected from among the complementary set of objects that are not among the set of objects located at positions identified by the object positions map.

At stage 404, the training system trains the object detector neural network on the training data sets. The training can include a series of sub-stages 406-414.

At sub-stage 406, the training system selects a first training data set from the set of training data sets. At sub-stage 408, the object detector neural network processes the first training input and the second training input from the training data set to generate a predicted set of output scores. The object detector neural network processes the training inputs in accordance with current values of internal parameters of the network. The predicted set of output scores can include a respective score for each position in a set of positions of the image represented by the first training input.

At sub-stage 410, the training system determines an error using the predicted set of output scores generated by the object detector neural network and the target output. At sub-stage 412, the training system then adjusts the current values of the parameters of the object detector neural network. In some implementations, the training system uses conventional machine-learning techniques to train the neural network, such as stochastic gradient descent with back-propagation. For example, the training system can back-propagate gradients of a loss function that is based on the determined error to adjust current values of the parameters of the neural network system to optimize the loss function.

At sub-stage 414, the training selects a different training data set from the set of training data sets and returns to sub-stage 408 to continue training the object detector neural network using the selected training data set. The training system completes training of the neural network once a training termination condition is satisfied or no further training data sets are available.

In addition to the implementations described above, alternative implementations are also contemplated. For example, the neural network system 100 may be configured to detect multiple objects at the same position of an image. For instance, if a vehicle is parked under a tree, both system may detect both objects (i.e., the vehicle and the tree) at a same position in the image. The memory interface subsystem may record a count of a number of objects that have been selected at each position. Additional objects may be selected at successive time steps for the same position so long as the count of detected objects at the position does not exceed a number of objects that the object detector neural network 102 identifies as being located at the position.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   for each time step after an initial time step in a series of time steps:
      obtaining a first input that represents an input image, wherein the input image depicts a set of objects at various positions of the input image;
      obtaining a second input that identifies respective positions in the input image of a subset of objects from the set of objects;
      determining, by processing the first input and the second input, with a neural network, a position in the input image of an additional object that is not among the subset of objects; and
      adding the position of the additional object to the second input so that the additional object is among the subset of objects in the next time step.

2. The method of claim 1, wherein the method continues until positions for all objects in the set of objects depicted in the input image are determined.

3. The method of claim 1, wherein, at the initial time step, the second input identifies a null set of positions.

4. The method of claim 3, comprising:
   determining, by processing the first input and the second input, with the neural network, a position in the input image of an initial object in the set of objects; and
   adding the position of the initial object to the second input so that the initial object forms the subject of objects in the next time step following the initial time step.

5. The method of claim 1, comprising at a final time step in the series of time steps:
   detecting that no additional positions of objects in the input image can be determined, and in response, ceasing further attempts to determine positions of additional objects in the input image.

6. The method of claim 1, wherein a number of time steps in the plurality of time steps is not fixed.

7. The method of claim 1, comprising determining whether an additional object is depicted in the input image by (i) generating a first output with the neural network indicating a likelihood that any additional object is depicted in the input image, and (ii) comparing the first output to a threshold value.

8. The method of claim 7, comprising processing the first input and the second input with the neural network to generate a second output that includes a plurality of scores, wherein each score of the plurality of scores corresponds to a different position of the input image and indicates a likelihood that the corresponding position of the input image depicts an object that has not been detected at any preceding time step.

9. The method of claim 1, wherein the neural network is implemented on a computing system onboard an autonomous vehicle, and the input image is an image of an environment surrounding the autonomous vehicle.

10. The method of claim 1, wherein the neural network is a feedforward neural network.

11. A computing system, comprising:
   one or more processing devices; and
   one or more computer-readable media encoded with instructions that, when executed by the one or more processing devices, cause the one or more processing devices to perform operations comprising:
      for each time step after an initial time step in a series of time steps:
         obtaining a first input that represents an input image, wherein the input image depicts a set of objects at various positions of the input image;
         obtaining a second input that identifies respective positions in the input image of a subset of objects from the set of objects;
         determining, by processing the first input and the second input, with a neural network, a position in the input image of an additional object that is not among the subset of objects; and
         adding the position of the additional object to the second input so that the additional object is among the subset of objects in the next time step.

12. The computing system of claim 11, wherein the operations continue until positions for all objects in the set of objects depicted in the input image are determined.

13. The computing system of claim 11, wherein, at the initial time step, the second input identifies a null set of positions.

14. The computing system of claim 13, wherein the operations comprise:
   determining, by processing the first input and the second input, with the neural network, a position in the input image of an initial object in the set of objects; and
   adding the position of the initial object to the second input so that the initial object forms the subject of objects in the next time step following the initial time step.

15. The computing system of claim 11, wherein the operations comprise at a final time step in the series of time steps:
   detecting that no additional positions of objects in the input image can be determined, and in response, ceasing further attempts to determine positions of additional objects in the input image.

16. The computing system of claim 11, wherein a number of time steps in the plurality of time steps is not fixed.

17. The computing system of claim 11, wherein the operations comprise determining whether an additional object is depicted in the input image by (i) generating a first output with the neural network indicating a likelihood that any additional object is depicted in the input image, and (ii) comparing the first output to a threshold value.

18. The computing system of claim 17, wherein the operations comprise processing the first input and the second input with the neural network to generate a second output that includes a plurality of scores, wherein each score of the plurality of scores corresponds to a different position of the input image and indicates a likelihood that the corresponding position of the input image depicts an object that has not been detected at any preceding time step.

19. The computing system of claim 11, wherein the neural network is implemented on a computing system onboard an autonomous vehicle, and the input image is an image of an environment surrounding the autonomous vehicle.

20. One or more non-transitory computer-readable media encoded with instructions that, when executed by one or more processing devices, cause the one or more processing devices to perform operations comprising:

for each time step after an initial time step in a series of time steps:

obtaining a first input that represents an input image, wherein the input image depicts a set of objects at various positions of the input image;

obtaining a second input that identifies respective positions in the input image of a subset of objects from the set of objects;

determining, by processing the first input and the second input, with a neural network, a position in the input image of an additional object that is not among the subset of objects; and adding the position of the additional object to the second input so that the additional object is among the subset of objects in the next time step.

* * * * *